(12) United States Patent
Motter

(10) Patent No.: US 8,000,553 B2
(45) Date of Patent: Aug. 16, 2011

(54) ACQUIRING A SERIES OF GRADIENT STOPS FROM A BITMAP SOURCE

(75) Inventor: DoRon B. Motter, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1047 days.

(21) Appl. No.: 11/690,056

(22) Filed: Mar. 22, 2007

(65) Prior Publication Data

US 2008/0231637 A1 Sep. 25, 2008

(51) Int. Cl.
*G06K 9/40* (2006.01)
(52) U.S. Cl. .................. 382/266; 382/260; 382/274
(58) Field of Classification Search .......... 382/260, 382/266, 274, 275
See application file for complete search history.

(56) References Cited

U.S. PATENT DOCUMENTS

| | | | |
|---|---|---|---|
| 6,201,550 B1 | 3/2001 | Sakamoto | |
| 6,784,896 B1 | 8/2004 | Perani et al. | |
| 6,879,327 B1 | 4/2005 | Mathur et al. | |
| 6,914,602 B2 | 7/2005 | Kaskel | |
| 6,977,501 B2 * | 12/2005 | Kassai et al. | 324/315 |
| 6,978,039 B2 * | 12/2005 | Cline et al. | 382/128 |
| 7,002,154 B2 * | 2/2006 | Wellman et al. | 250/352 |
| 7,038,697 B2 | 5/2006 | Gangnet et al. | |
| 7,043,712 B2 * | 5/2006 | Mukherjee et al. | 716/52 |
| 7,068,831 B2 * | 6/2006 | Florent et al. | 382/132 |
| 7,157,726 B2 * | 1/2007 | Naruoka | 250/559.19 |
| 7,183,050 B2 * | 2/2007 | Krull | 435/6 |
| 7,296,793 B2 * | 11/2007 | Yoshino | 271/233 |
| 2004/0042662 A1 | 3/2004 | Wilensky et al. | |
| 2004/0194020 A1 | 9/2004 | Beda et al. | |
| 2006/0066628 A1 | 3/2006 | Brodie et al. | |

OTHER PUBLICATIONS

Layout Galaxy "Basic Photoshop Working", retrieved from the Internet http://www.layoutgalaxy.com/photoshop5.5/getting-to-know3.php4 on Feb. 6, 2007.
Adrien-Luc Sanders, About: Animation, "Flash Tip: Program Tools: Eyedropper Tool", retrieved from the Internet http://animation.about.com/od/flashanimationtutorials/ss/flasheyedropper.htm on Feb. 6, 2007.
Robert Redwood "The Eyedropper Tool", retrieved from the Internet http://www.easyelements.com/eyedropper-tool.html on Mar. 22, 2007.

* cited by examiner

*Primary Examiner* — Yosef Kassa
(74) *Attorney, Agent, or Firm* — Woodcock Washburn LLP

(57) ABSTRACT

An apparatus and method provide for generation of a gradient or other image pattern based on a captured image. In one example, a portion of a displayed image may be selected. The selected portion of the displayed image may include an image pattern such as a gradient. The selected image pattern may be applied to a gradient tool such that the image pattern may be stored as a series of gradient stops. Any of the gradient stops may have an associated characteristic of the image pattern such as, for example, a color or position within the selection of a corresponding pixel of the image. The generated gradient or image pattern may be applied to any object or displayed component.

19 Claims, 14 Drawing Sheets

ACQUIRING A SERIES OF GRADIENT STOPS FROM A BITMAP SOURCE

BACKGROUND

Computer generated images and graphic designs have become increasingly complex. Computer users, graphic designers and illustrators have used various tools to produce a variety of effects in computer generated images. For example, graphic designers often create artwork containing objects filled with predefined gradients in which blending of colors create surface effects on rendered objects.

Typically, gradients are predefined within a vector-based illustration application and a user may select from a list of such predefined gradients. The selected predefined gradient may be applied to an object of interest by the user such that the object may be filled with the selected gradient. Also, a user may create a gradient fill by defining specific colors at specific points on the gradient fill. To accomplish this task, the user selects a color and assigns the selected color to one portion of a gradient and selects a second color and assigns the second color to another portion of the gradient.

However, the creation of a gradient fill by manually assigning colors can be tedious, especially if multiple colors are desired. Also, if a pattern of colors is obtained from an external source, there is no way for a user to efficiently create a gradient fill that simulates the pattern from the external source.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, a method is described for generating a gradient or image pattern. A portion of an image may be selected and at least one gradient stop may be generated based on the selected portion of the image. In another example, multiple gradient stops are generated with each gradient stop corresponding to an associated pixel in a selected image. In yet another example, at least one gradient stop may be selected for removal with the gradient being based on gradient stops that are not removed.

In another example, a computer-readable medium is described containing computer-executable code for performing a method in which a selection of a portion of an image is received and a gradient or gradient tool is generated containing image characteristics or qualities of the selected portion of the image.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Systems described herein are provided as examples and not limitations. As those skilled in the art will appreciate, the present examples are suitable for application in a variety of different types of computing systems.

Figure 1:
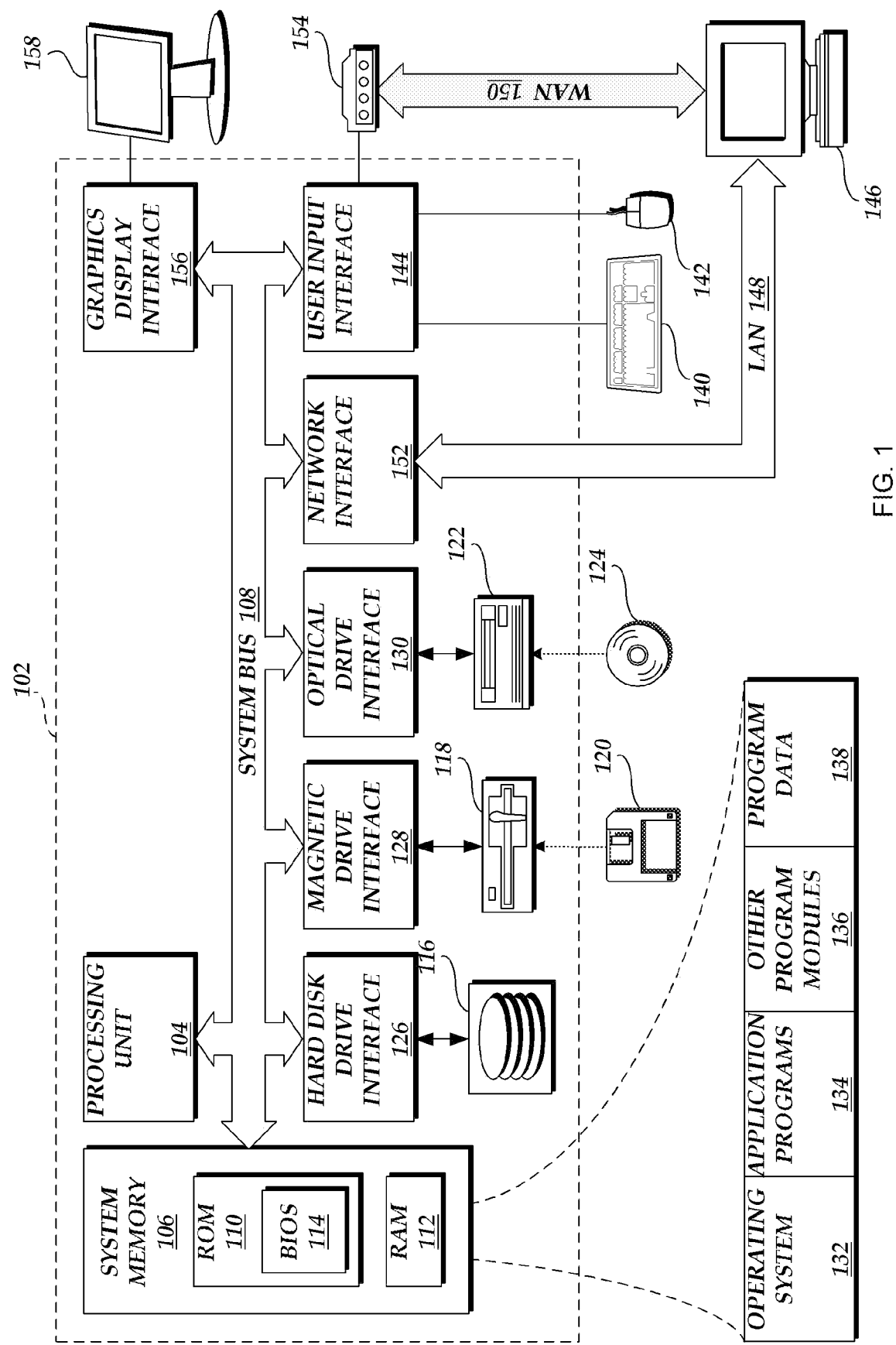
FIG. 1 illustrates an example of a suitable computing system environment for generating a gradient or image pattern.

FIG. 1 illustrates an example of a suitable computing system environment or architecture in which computing subsystems may provide processing functionality. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The method or system disclosed herein is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 102. Components of computer 102 may include, but are not limited to, a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 102 typically includes a variety of computer readable media. Computer readable media can be any available media that can be accessed by computer 102 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 102. Combinations of the any of the above should also be included within the scope of computer readable storage media.

The system memory 106 includes computer storage media in the form of volatile and/or nonvolatile memory such as read only memory (ROM) 110 and random access memory (RAM) 112. A basic input/output system 114 (BIOS), containing the basic routines that help to transfer information between elements within computer 102, such as during start-up, is typically stored in ROM 110. RAM 112 typically contains data and/or program modules that are immediately accessible to and/or presently being operated on by processing unit 104. By way of example, and not limitation, FIG. 1 illustrates operating system 132, application programs 134, other program modules 136, and program data 138.

The computer 102 may also include other removable/non-removable, volatile/nonvolatile computer storage media. By way of example only, FIG. 1 illustrates a hard disk drive 116 that reads from or writes to non-removable, nonvolatile magnetic media, a magnetic disk drive 118 that reads from or writes to a removable, nonvolatile magnetic disk 120, and an optical disk drive 122 that reads from or writes to a removable, nonvolatile optical disk 124 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 116 is typically connected to the system bus 108 through a non-removable memory interface such as interface 126, and magnetic disk drive 118 and optical disk drive 122 are typically connected to the system bus 108 by a removable memory interface, such as interface 128 or 130.

The drives and their associated computer storage media discussed above and illustrated in FIG. 1, provide storage of computer readable instructions, data structures, program modules and other data for the computer 102. In FIG. 1, for example, hard disk drive 116 is illustrated as storing operating system 132, application programs 134, other program modules 136, and program data 138. Note that these components can either be the same as or different from additional operating systems, application programs, other program modules, and program data, for example, different copies of any of the elements. A user may enter commands and information into the computer 102 through input devices such as a keyboard 140 and pointing device 142, commonly referred to as a mouse, trackball or touch pad. Other input devices (not shown) may include a microphone, joystick, game pad, pen, scanner, or the like. These and other input devices are often connected to the processing unit 104 through a user input interface 144 that is coupled to the system bus, but may be connected by other interface and bus structures, such as a parallel port, game port or a universal serial bus (USB). A monitor 158 or other type of display device is also connected to the system bus 108 via an interface, such as a video interface or graphics display interface 156. In addition to the monitor 158, computers may also include other peripheral output devices such as speakers (not shown) and printer (not shown), which may be connected through an output peripheral interface (not shown).

The computer 102 may operate in a networked environment using logical connections to one or more remote computers, such as a remote computer. The remote computer may be a personal computer, a server, a router, a network PC, a peer device or other common network node, and typically includes many or all of the elements described above relative to the computer 102. The logical connections depicted in FIG. 1 include a local area network (LAN) 148 and a wide area network (WAN) 150, but may also include other networks. Such networking environments are commonplace in offices, enterprise-wide computer networks, intranets and the Internet.

When used in a LAN networking environment, the computer 102 is connected to the LAN 148 through a network interface or adapter 152. When used in a WAN networking environment, the computer 102 typically includes a modem 154 or other means for establishing communications over the WAN 150, such as the Internet. The modem 154, which may be internal or external, may be connected to the system bus 108 via the user input interface 144, or other appropriate mechanism. In a networked environment, program modules depicted relative to the computer 102, or portions thereof, may be stored in the remote memory storage device. By way of example, and not limitation, remote application programs may reside on a memory device. It will be appreciated that the network connections shown are exemplary and other means of establishing a communications link between the computers may be used.

A method and system is described for producing gradient effects in an image or graphics data file. Multiple colors, tones, or shades may be blended together to create any variety of image effects. For example, different surface effects may be created through the application of gradient effects to simulate different surfaces such as glass, water, porcelain, metal, etc.

Figure 2:
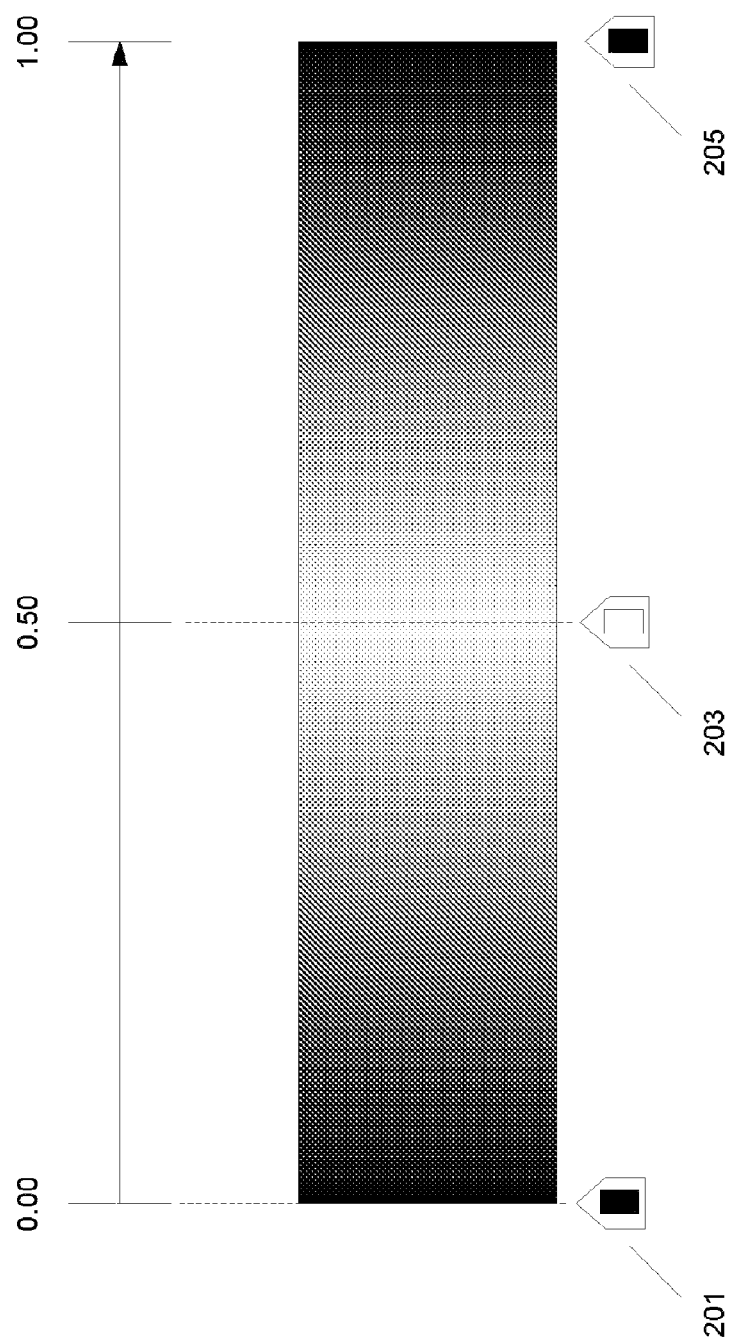
FIG. 2 illustrates an example of a gradient.

FIG. 2 illustrates an example of a gradient. A gradient may include any number blended colors, shades, or tones. For example, a first color may be applied to one end or to one portion of a gradient while a second color may be applied to the other end or another portion of the gradient. Sections of the gradient between the first and second colors may include a blending of the two colors or a progression or gradation from the first color to the second color. Similarly, additional colors may be added between the first and second colors for more complex blends and gradients. In one example, black and white are blended together to create a gradient in which the black and white portions merge together. In this example, black and white are blended in a linear gradient over a linear direction or gradient axis. Gradient stops may be included in a gradient for defining characteristics of a gradient, such as color and/or location of the color in the gradient. Colors and/or offsets of the colors may be defined by any number of gradient stops (201, 203, or 205 in FIG. 2). Thus, a gradient may include any number of gradient stops between a start point and end point of the gradient with each of the gradient stops describing one or more characteristics of a location within the gradient.

In the example illustrated in FIG. 2, gradient stops may describe a color property and/or an offset property of the colors in the gradient. Any number of properties may be described by gradient stops. For example, color, offset, shade, transparency, tone, saturation, etc. may also be indicated by gradient stops. Any property may be defined or assigned to a corresponding location in the gradient indicated by a gradient stop. The color property describes the color associated with the portion of the gradient stop at the corresponding gradient stop and the offset property may describe the position of the corresponding color within the gradient. As illustrated in the example of FIG. 2, gradient stops 201 and 205 describe black as a color property at the location indicated by the gradient stops. Location of each of the gradient stops may further be described by an offset position. For example, gradient stop 201 has an offset position of 0.00 within the gradient and gradient stop 205 has an offset position of 1.00 within the gradient, where 0.00 may indicate a start point of the gradient and 1.00 may indicate an end point of the gradient. Thus, in this example, offset values range from 0 to 1.0, where 0 indicates the beginning or start (e.g., start point) of the gradient and 1.0 represents the end or endpoint of the gradient. Therefore, in this example, gradient stop 201 describes a black portion of the gradient located at the beginning/start point of the gradient and gradient stop describes a black portion of the gradient located at the end of the gradient (e.g., endpoint of the gradient).

Also illustrated in FIG. 2, gradient stop 203 has an offset of 0.5 and has a color property of white. Hence, gradient stop 203 indicates that the gradient in this example contains a white portion (color property) offset to halfway within the gradient (offset property of 0.5). The black portion described by gradient stop 201 blends with the white portion described by gradient stop 203 to form a graduated blend of gray between gradient stop 201 and gradient stop 203. Similarly, the white portion of the gradient described by gradient stop 203 blends with the black portion of the gradient described by gradient stop 205 to form a graduated blend of varying grays between gradient stop 203 and gradient stop 205.

Gradients may be applied via a gradient tool. The gradient tool may include a user interface element or component that may be displayed on a computer display such as monitor 158 (FIG. 1). The gradient tool may include an icon, button, or other user interface element displayed to a user. Selection of the gradient tool may invoke a gradient tool display or control image in which a gradient may be created.

Figure 3:
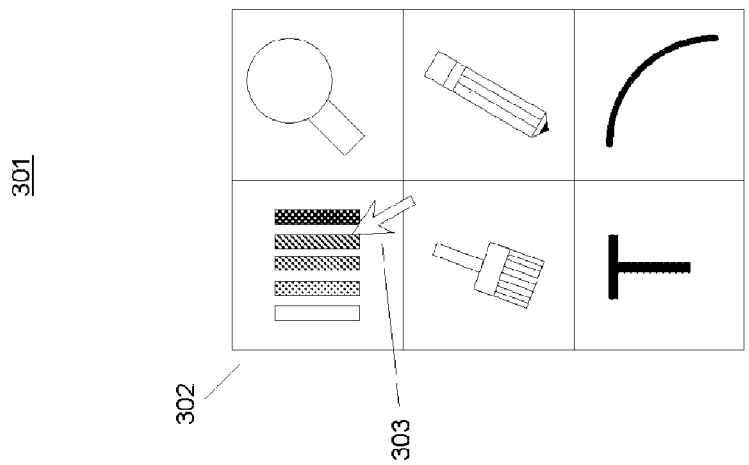
FIG. 3 illustrates one example of a toolbox user interface display.

FIG. 3 illustrates one example of a toolbox user interface display for providing gradient features. Any user interface may be used with FIG. 3 being merely one example. In this example, a toolbox 301 is displayed that includes any number of tools. Selection of any of the tools provides a corresponding functionality. The toolbox user interface 301 may includes a gradient tool or brush 302 for providing a capability of creating a gradient and/or applying a gradient effect to an object. A user may select the gradient tool or brush in any number of ways. For example, a user may control the movement or location of a cursor 303 such that the cursor 303 hovers over a displayed gradient tool or brush 302, as illustrated in FIG. 3. Selection of the gradient tool or brush 302 may result in application of a gradient to a selected data or image field. Alternatively, selection of the gradient tool or brush 302 may cause the display of a second user interface such as a gradient tool control display. FIG. 3 also illustrates examples of other tools in the toolbox 301. The other tools are for illustration purposes only as any number or type of tools may be present in the toolbox 301.

Figure 4:
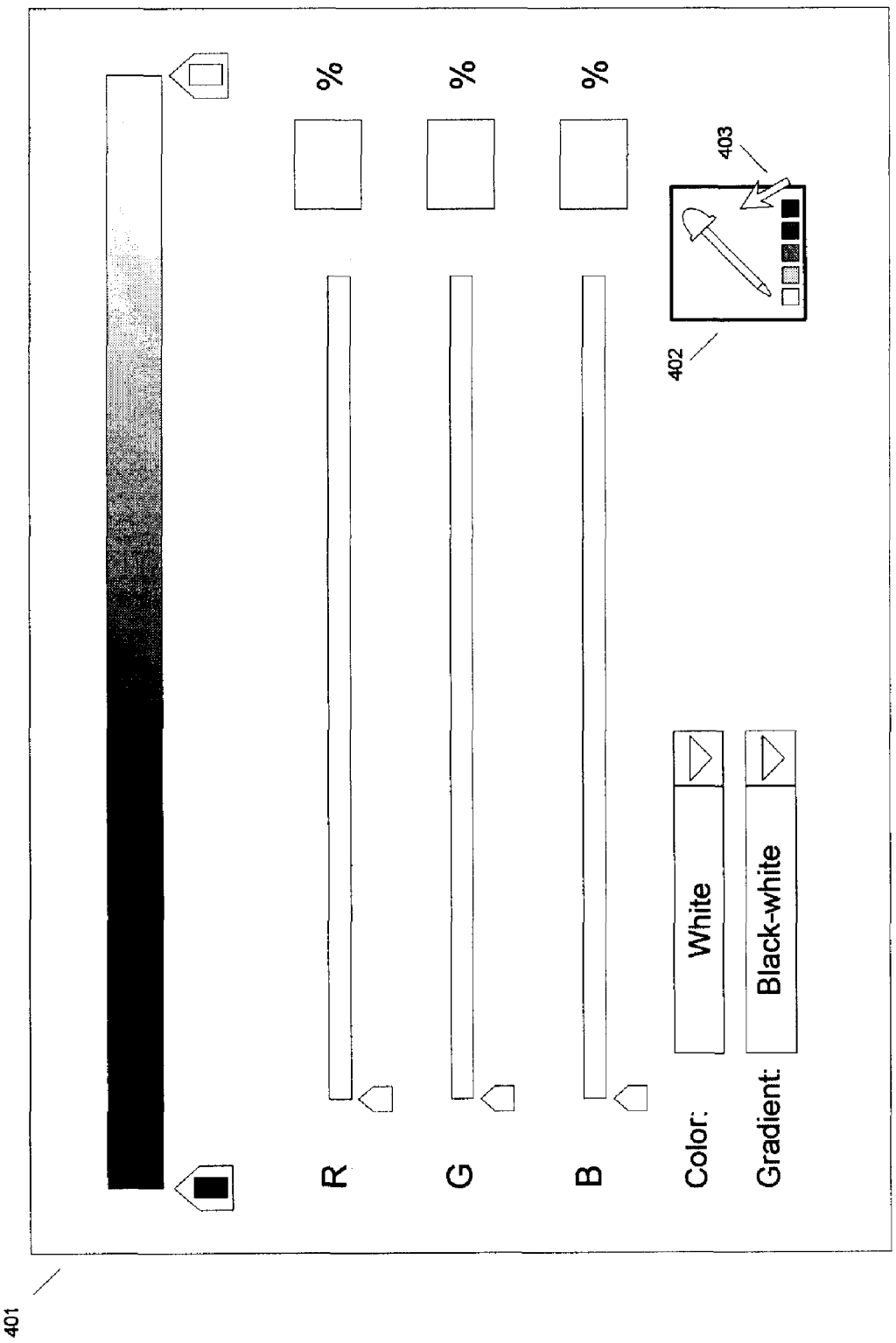
FIG. 4 illustrates an example of a user interface for control of the gradient tool.

In one example, the gradient tool 302 may be selected. Selection of the gradient tool 302 in this example may result in the display of a second user interface such as the gradient tool control display 401 illustrated in FIG. 4. FIG. 4 illustrates an example of a user interface for control of the gradient tool in which a gradient may be created, modified, named, generated, etc. FIG. 4 is merely one example of a gradient tool display as any additional features may also be present or configured. In addition, any feature may be skipped.

As FIG. 4 illustrates, the gradient tool may include controls for indicating a color to be included in a gradient and/or a location within the gradient for the color. The color may be specified in a variety of ways. In one example, a gradient stop may be set to a desired location within the gradient and the color property associated with the gradient stop may be indicated by setting each color component, e.g., Red (R), Green (G), or Blue (B). Setting components of a color may be accomplished in any variety of ways, for example, by adjusting a slide bar or indicating a value or percentage of a color component. Alternatively, a color may be assigned by selecting a desired color from a list of colors or a color palette of colors. A color property, offset property, or any other property may be assigned to any number of gradient stops in the gradient as shown in FIG. 4. The gradient may further be named and/or saved and applied to a desired data or image field.

In addition, the gradient tool control display may include additional tools for obtaining additional gradients of desired properties. Additional gradients may be obtained in a variety of ways. For example, an image pattern may be converted from an image file such as a bitmap image, into a gradient tool. In this example, a gradient capture tool 402 may provide gradient capture capabilities. A user may select the gradient capture tool 402 and may apply the gradient capture tool 402 to any image. In the example illustrated in FIG. 4, a user may position a cursor 403 over a gradient capture tool 402 and may select the gradient capture tool 402. Selection of the gradient capture tool 402 may result in the display of an icon, cursor, or other image corresponding to the gradient capture tool 402. Movement of the icon, cursor, or other image of the gradient capture tool over a display may cause a gradient or other image pattern over the area selected by the icon or other image of the gradient capture tool to be assigned to a gradient in a gradient tool. Thus, in this example, a selected portion of a displayed image may be used to create a gradient tool or brush such that the gradient, color, offset, or other qualities/characteristics of the selected portion of the displayed image may be applied to another image as a gradient.

For example, an image may be obtained on a computing device. The image may be obtained by any number of methods. For example, a user may download an image from a server or website. The user may also capture an image by other means, such as capturing an image with a digital camera, and may access the captured image through use of the gradient tool. The image may be displayed on a display monitor and the user may select a portion of the displayed image. For example, the displayed image may contain a bitmap image of a landscape or any other subject matter of interest. The bitmap image may contain a portion in which a particular color scheme is desired by the user. The user may select the desired portion of the image. The selection may be input into the system via the gradient tool and a gradient tool may be created or modified to provide the color scheme present in the selected portion of the image. For example, gradient stops with characteristics and parameters corresponding to a pattern or color scheme of the selected portion of the image may be determined and may be assigned to a gradient which may be applied to an object.

Additionally or alternatively, certain gradient stops may be determined to be removed. If a gradient stop is determined to be removable, then the gradient stop may be removed. Otherwise, the gradient stop may be retained to provide gradient stop information such as color, offset, etc. The selection process for determining if a gradient stop may be removed from the gradient is described more fully below.

Figure 5:
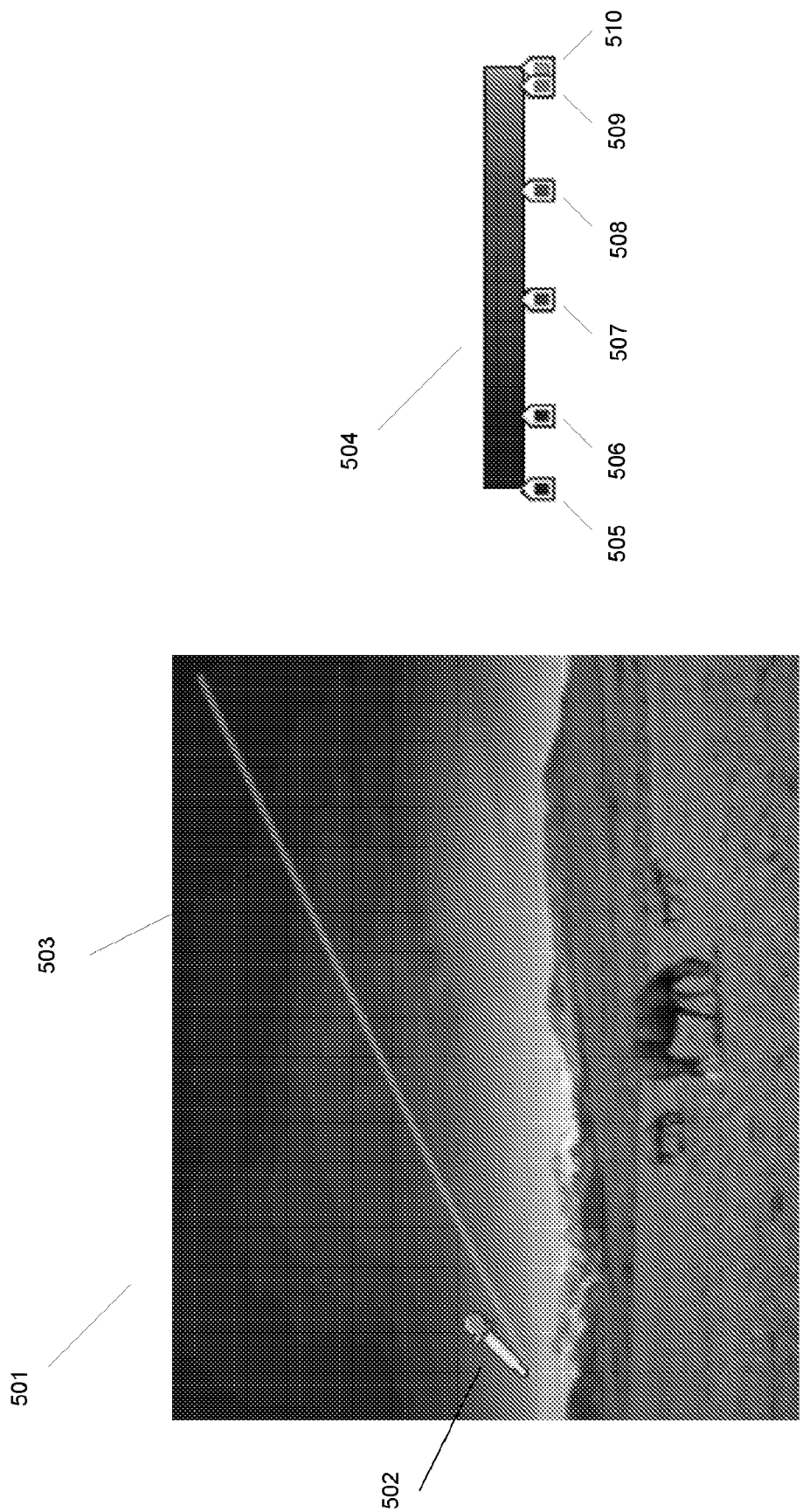
FIG. 5 illustrates an example of gradient capturing to a gradient tool.

FIG. 5 illustrates an example of gradient capturing to a gradient tool. In this example, a gradient capture tool (e.g., gradient capture tool 402, FIG. 4) may be selected. Responsive to selection of the gradient capture tool, an icon 502 corresponding to the gradient capture tool may be invoked for selecting a portion of an image. In this example, an image 501 is displayed on a computing device monitor. The icon 502 is used to select a portion of the displayed image 501. In this illustration, the icon 502 is dragged over a portion of the image 501 over a selection path 503. The selection path 503 traverses pixels of the displayed image 501.

Figure 6:
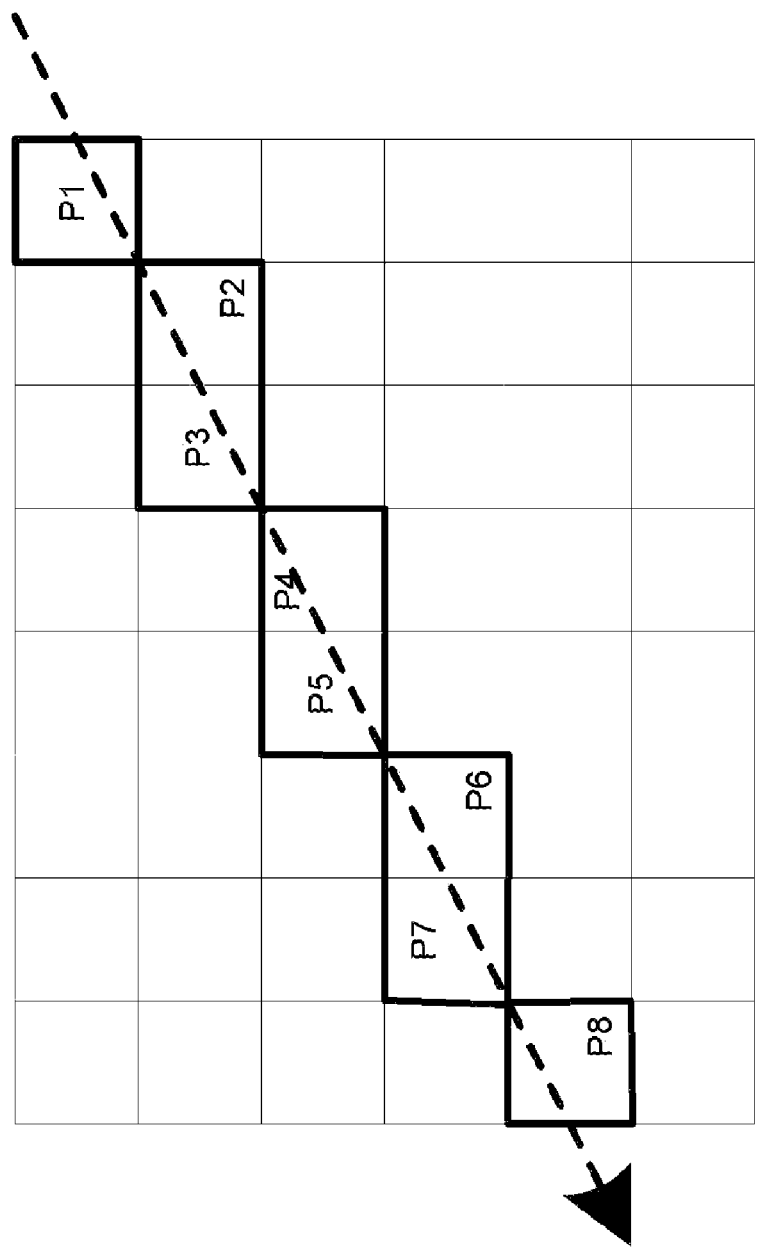
FIG. 6 illustrates an enlarged view of a selection of a portion of an image.

FIG. 6 illustrates an enlarged view of a selection of a portion of an image. In this example, a cursor may be dragged over a selected portion of an image over a selection path (dotted arrow). The selection path traverses any number of pixels (e.g., P1-P8). The pixels selected by the selection path are indicated by the bold outline in FIG. 6. Characteristics of each of the selected pixels (P1-P8, in this example) may be recorded and may be used to create a corresponding pattern in a gradient of a gradient tool. In one example, characteristics associated with pixel P1 may be applied to a first gradient stop, characteristics associated with pixel P2 may be applied to a second gradient stop, characteristics associated with pixel P3 may be applied to a third gradient stop, etc. Thus, an image pattern, which may include a gradient, may be generated in a gradient tool that corresponds to the image pattern captured in the selected or traversed pixels. The image pattern may include a gradient in which one color or shade blends into another color or shade such that the gradient includes gradual progression from one color or shade to the other color or shade from a start point to and end point. Alternatively, the image pattern may include any variation in color, shade, tone, etc. For example, the image pattern may include a gradient in which multiple colors or shades are present such that the color or shade may be altered a multiple of time in a progression from the start point to the end point. Thus, a gradient may encompass any number or type of variations in any direction or magnitude and any pattern.

Returning to FIG. 5, the characteristics of the traversed pixels (e.g., color, offset, shade, etc.) may be captured as a gradient 504 of a gradient tool by the gradient capture tool. A gradient 504 may be created having the qualities of the pixels over which the select path 503 traverses. In this case, the resulting gradient tool 504 contains a gradient that simulates the relative pixel qualities and characteristics from the selected portion of the image 501. The selected portion of the image 501 (e.g., the area of the image 501 traversed by selection path 503) contains a gradient in which the color/shade at the starting point of the selection path 503 is dark and the color/shade at the ending point of the selection path 503 is light. The color/shade of the intervening portion of the image under the selection path 503 becomes progressively light from the initial start point.

Gradient stops (505-510) corresponding to the selected image are determined and assigned to the gradient tool. Each of the gradient stops contains characteristics corresponding to a portion of the selected image. For example, a color, shade, saturation, offset, etc. may be determined for each of the gradient stops in the gradient. Additionally or alternatively, multiple gradient stops may be determined for a selected portion of an image and certain gradient stops may be selected for removable. After removing gradient stops determined to be removable, a smaller subset of gradient stops may remain. The subset of gradient stops may be used to form a gradient. The gradient thus formed may be assigned to a particular gradient tool and may be applied to another image.

Figure 7:
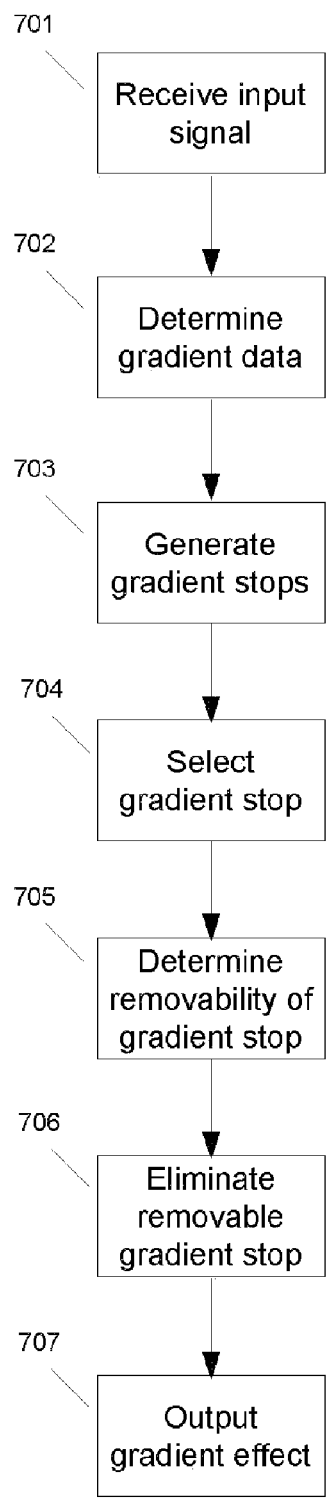
FIG. 7 is a flowchart illustrating one example of a method for creating a gradient for a gradient tool.

FIG. 7 is a flowchart illustrating one example of a method for creating a gradient. The gradient may include any number of variations of color, tone, shade, etc. in a progression from one point to another. The variations in color, tone, shade, etc. may be in any direction and may be in any order or pattern. Also, the variations may be of any type or magnitude. In this example, a user may use a gradient capture tool (e.g., gradient capture tool 402, FIG. 4) by dragging an icon associated with the gradient capture tool over a displayed image. The displayed image may be any type of image and may include a pattern of color or shade changes. The system receives an input signal (STEP 701) which indicates a selected portion of the image. For example, a user may drag a gradient capture tool over a portion of a displayed image from a start point to an end point over a selection path. The color, shade, tone, etc. of the image may change as the gradient capture tool is dragged over this distance on the selection path. Each pixel of the image over which the gradient capture tool is dragged contains certain characteristics defining the pixel data. For example, a pixel may contain a color value for indicating a color associated with that pixel. Also, a pixel may contain offset information for describing the location of the pixel within the selection path.

Sampling of data may be accomplished in many ways. In one non-limiting example for sampling of data in a selected portion of an image, the user drags a gradient capture tool in a line segment over a desired image. Characteristics of sampled pixels under the line segment are recorded. Gradient data may be determined (STEP 702) based on the sampled pixels. Thus, in one example, color and/or offset data for each sampled pixel is determined from the sampled pixels (STEP 702). This data may be used to create a series of gradient stops (STEP 703). For example, color and/or offset data of a sampled pixel may be assigned to a corresponding gradient stop to generate a series of gradient stops (STEP 703).

Additionally or alternatively, gradient stops may be selected for removal from the gradient tool (STEP 704). In this example, each of the generated gradient stops may be examined to determine if any of the gradient stops may be removed (STEP 705). Determination of removability of a gradient stop may be accomplished in a variety of ways. In one example, an error from removal of each of the points in the gradient (e.g., gradient stops) is determined and compared against a predetermined error value. If removal of a given point or gradient stop from the gradient results in an error that is less than the predetermined error value, the point or gradient stop may be eliminated from the gradient (STEP 706). When removal of any remaining points or gradient stops in the gradient results in an error that exceeds the predetermined error value, the remaining gradient stops are retained in the gradient and the resulting gradient is output (STEP 707). For example, the gradient may be applied to a selected region or object on a display.

The predetermined error value may be pre-selected by a user, for example. In this example, a desired error value may be received from, for example, a user, and the error value may be stored in memory. The received error value may be compared to each of the determined errors from removal of each of the gradient stops as described above. Alternatively, the predetermined error value may be pre-installed. In this example, the predetermined error value may be hard-coded and may not be modified or specified by a user. In yet another example, the predetermined error value may be pre-installed but may be modified, if desired.

Figure 8:
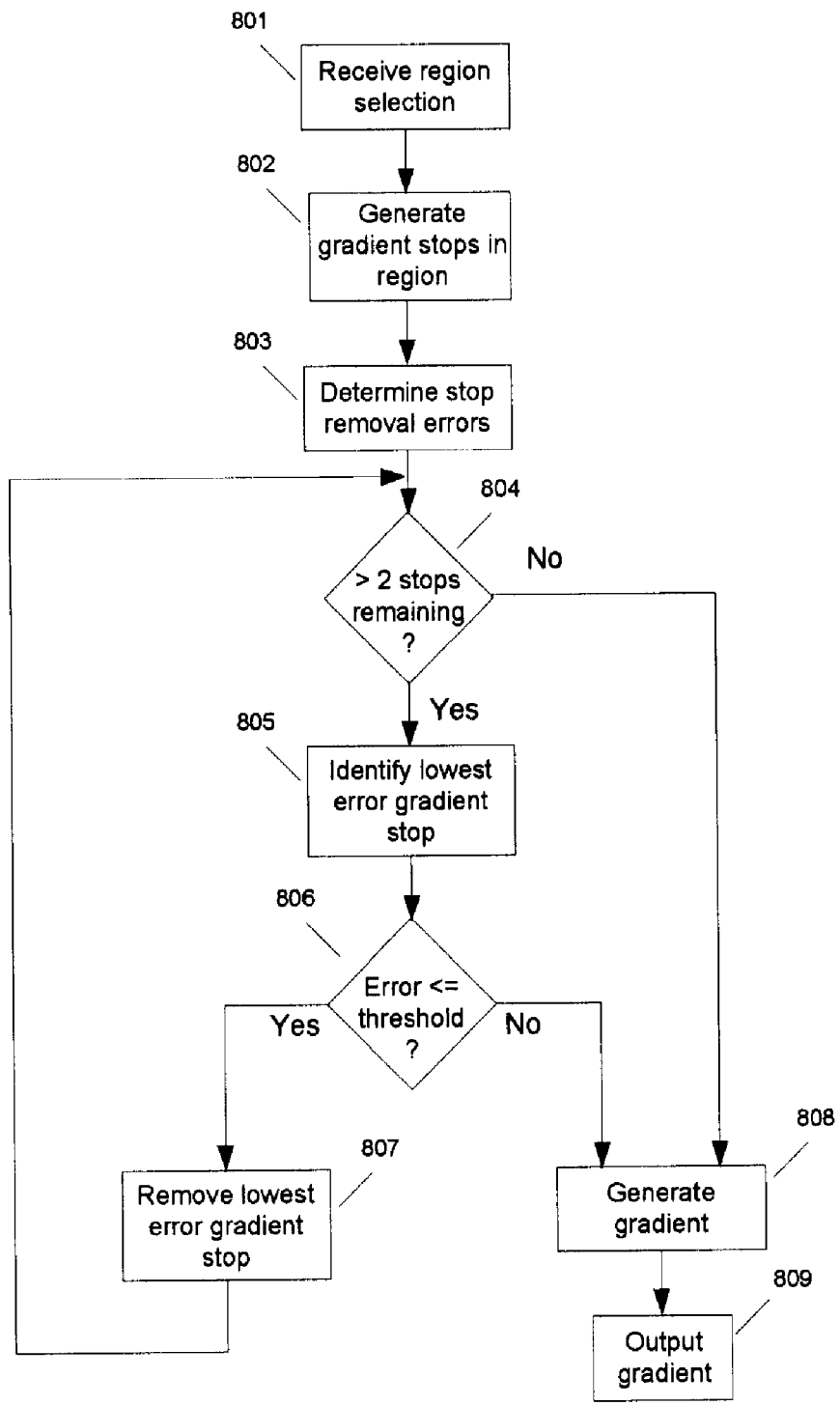
FIG. 8 is a flowchart illustrating an example of generating a gradient and removal of gradient stops.

FIG. 8 is a flowchart illustrating an example of generating a gradient and removal of gradient stops. In this example, a region selection is received (STEP 801). For example, a user may indicate a portion of an image (e.g., bitmap image) for which to capture image data such as color or offset. This information may be used to generate a gradient by generation of gradient stops (STEP 802) corresponding to pixel information of pixels selected in STEP 801. For example, a user may select a region of a displayed image by dragging a cursor, tool, or icon over the selected region. The selection may include selection of a series of pixels between a start point and end point of the selection. The series of selected pixels may progressively change in characteristics. For example, color or tone may change from one pixel or group of pixels to another. Any number or type of changes in color or tone may be identified in the series of pixels. Color and/or offset information corresponding to the selected series of pixels may be assigned to corresponding gradient stops.

Figure 9:
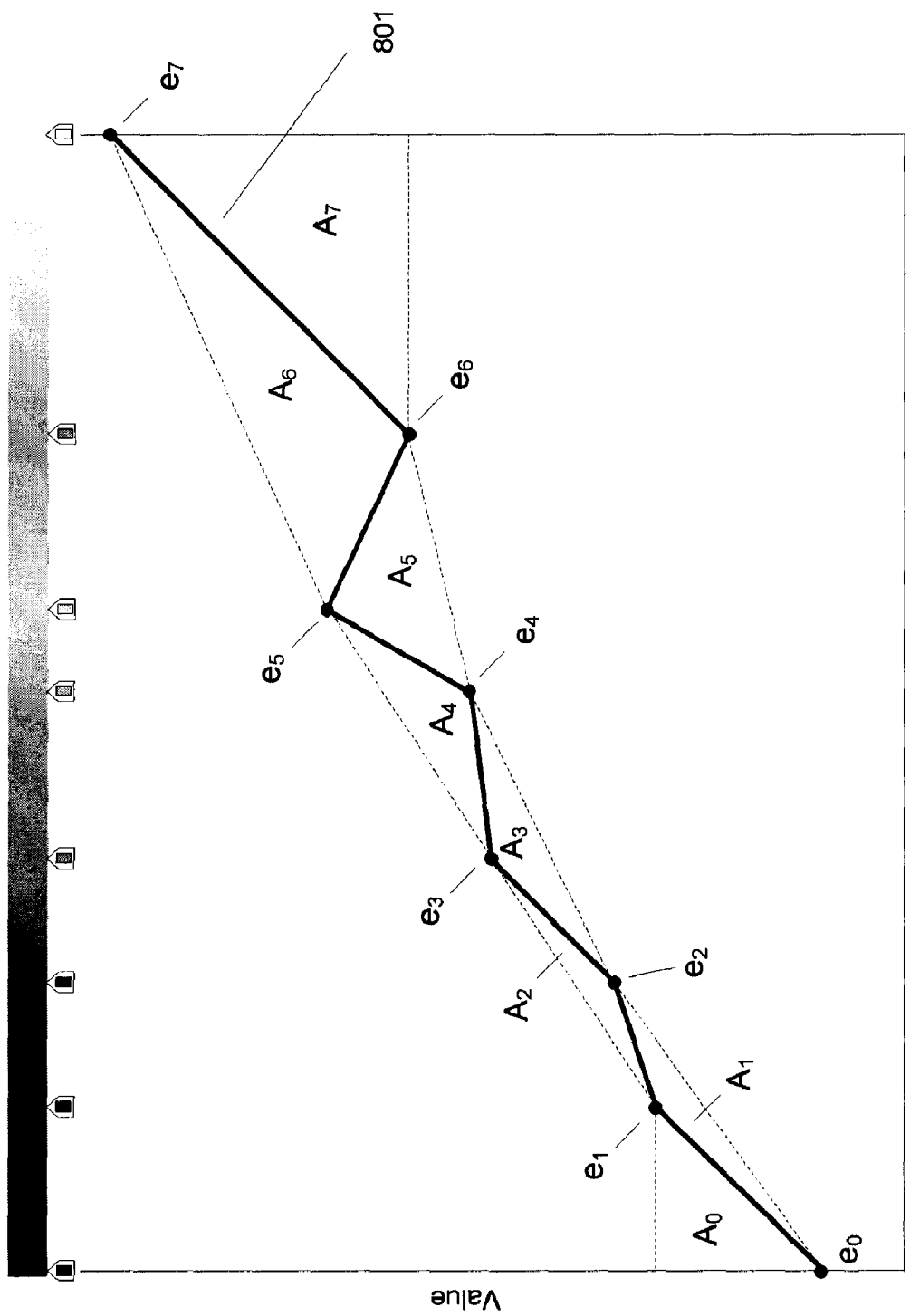
FIG. 9 illustrates an example of determining errors associated with removal of gradient stops.

In STEP 803, gradient stop removal errors are determined for the generated gradient stops. In this example, an error is calculated based on removal of each of the generated points. FIG. 9 is a graph illustrating an example of determining errors associated with removal of gradient stops. As the example of FIG. 9 illustrates, a series of points or gradient stops provides a pattern of values for color and offset in the gradient. Removal of each of the points or gradient stops may result in the introduction of an error to the curve. For example, if point $e_1$ is removed, the curve would be modified such that a direct connection between point $e_0$ and $e_2$ would replace the two line segments in the graph of FIG. 9 between point $e_0$ and $e_1$ and between point $e_1$ and $e_2$. Hence, if point $e_1$ were removed, an error substantially equal to the area of $A_1$ would be introduced. Likewise, if point $e_2$ were to be removed, an error approximately equal to $A_2$ would be introduced into the gradient; if point $e_3$ were to be removed, an error approximately equal to $A_3$ would be introduced into the gradient; if point $e_4$ were to be removed, an error approximately equal to $A_4$ would be introduced into the gradient; if point $e_5$ were to be removed, an error approximately equal to $A_5$ would be introduced, etc.

Returning to FIG. 8, in STEP 803, each removal error is determined for a removal of each of the gradient stops. In STEP 804, the number of gradient stops may be determined. If the gradient contains two or fewer gradient stops ("No" branch of STEP 804), the gradient may be generated based on the two or fewer gradient stops (STEP 808). If there are greater than two gradient stops in the gradient ("Yes" branch of STEP 804), the gradient stop associated with the lowest removal error is identified and selected (STEP 805). For example, in the example illustrated in FIG. 9, removal of gradient stop $e_2$ results in the smallest error (i.e., area of $A_2$ in this example). Thus, in this example, gradient stop $e_2$ is selected for possible removal.

In STEP 806, removal of the gradient stop with the lowest removal error is determined based on a size of the removal error. For example, in the example illustrated in FIG. 9, removal of gradient stop $e_2$ may result in a removal error about equal to the area of $A_2$. The removal error is compared to a predetermined threshold error. If the removal error of gradient stop $e_2$ is less than the predetermined threshold error ("Yes" branch of STEP 806), gradient stop $e_2$ may be removed (STEP 807). In the example illustrated in FIG. 9, the removal error of gradient stop $e_2$ results in an error to the gradient of area $A_2$. The removal error is determined to be within the predetermined threshold error and gradient stop $e_2$ is removed. Removal of gradient stop $e_2$ results in the example illustrated in FIG. 10. Also illustrated in FIG. 10, the removal areas of gradient stops adjacent to gradient stop $e_2$ (i.e., $e_1$ and $e_3$) may be modified based on the removal of gradient stop $e_2$. For example, after removal of gradient stop $e_2$, gradient stop $e_1$ is adjacent to gradient stop $e_0$ and gradient stop $e_3$. Hence, in one example, the error of removal of gradient stop $e_1$ may be determined based on the area of $A_{1a}$ as illustrated in FIG. 10.

Figure 10:
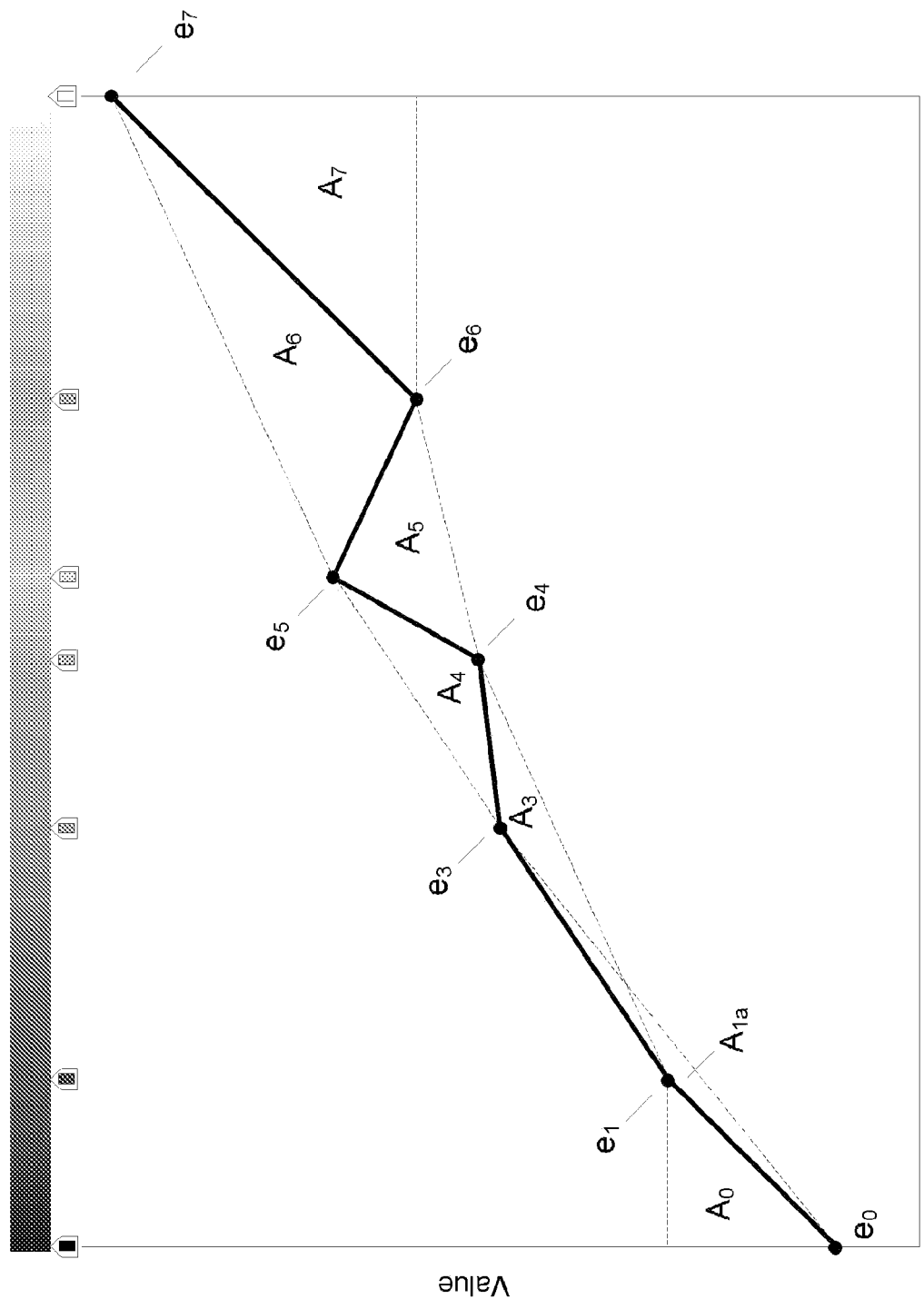
FIG. 10 illustrates another example of determining errors associated with removal of gradient stops.

FIG. 10 further illustrates simplification of a gradient. Gradient stop $e_2$ has been removed from the gradient such that gradient stops $e_0$, $e_1$, $e_3$, $e_4$, $e_5$, $e_6$, and $e_7$ remain in the gradient. Returning to FIG. 8, there are greater than two gradient stops remaining in the gradient ("Yes" branch of STEP 804). The gradient stop associated with the next lowest removal error is identified (STEP 805). In this example, removal of $e_1$ is determined to result in the lowest introduced error. The error in this case is estimated by the area of $A_{1a}$ which corresponds to the error that would be introduced if gradient stop $e_1$ is removed. Gradient stop $e_1$ is identified as a potentially removable point or gradient stop and removal of the gradient stop is determined by comparing the error introduced by removal of $e_1$ (i.e., $A_1$) to a predetermined threshold error (STEP 806). If the error is within the threshold error ("Yes" branch of STEP 706), point or gradient stop $e_1$ is removed.

Figure 11:
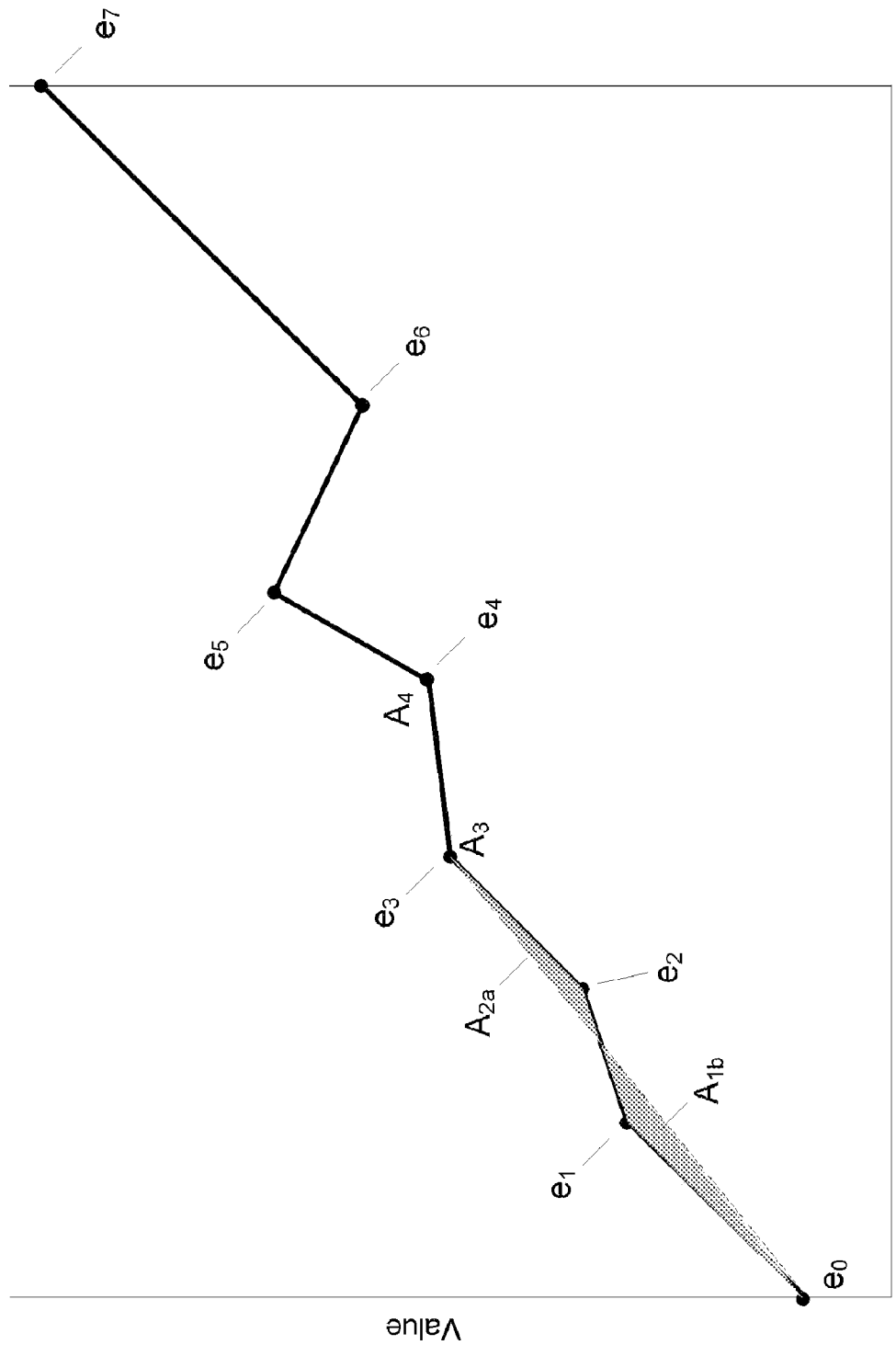
FIG. 11 illustrates another example of error determination in gradient stops.

In one example, the error is estimated by the area of $A_{1a}$ as described above. In another example, the error introduced by removal of $e_1$ is determined based on a comparison with the image pattern prior to removal of any of the gradient stops. FIG. 11 illustrates the original curve (which includes gradient point $e_2$) and an estimated error upon removal of gradient stop $e_1$ as compared to the original curve. As FIG. 11 shows, removal of gradient stop $e_1$ and $e_2$ results in an error about equal to the area of $A_{1b}$ and $A_{2a}$. In this example, gradient stop $e_2$ has been removed. Therefore, the additional removal of gradient stop $e_1$ would result in an actual error of the sum of $A_{1b}$ and $A_{2a}$. Hence, the sum of $A_{1b}$ and $A_{2a}$ may be compared to a predetermined threshold error value to determine removability of the gradient stop.

Figure 12:
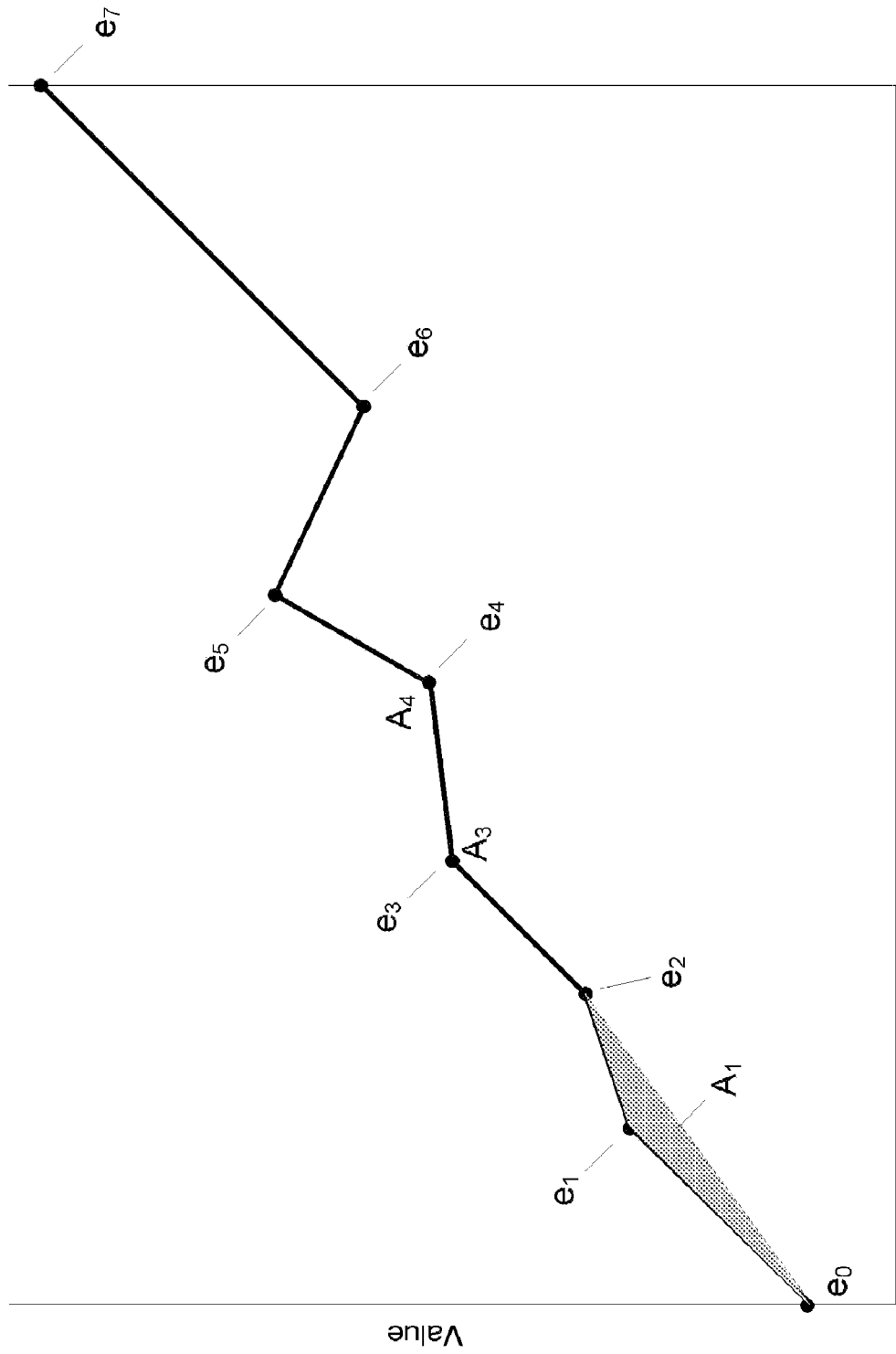
FIG. 12 illustrates another example of error determination in gradient stops.

In yet another example of error estimation, the error of gradient stop $e_1$ may be estimated as shown in FIG. 12. In this example, the estimated error associated with removal of gradient stop $e_1$ is based on the error obtained with only removal of gradient stop $e_1$. Hence, the error of removal of gradient stop $e_1$ in this example is based on the error introduced by removal of gradient stop $e_1$ in the presence of gradient stop $e_2$. As FIG. 12 illustrates, the error resulting from removal of gradient stop $e_1$ may be estimated by the area of $A_1$. The estimated error may be compared to a predetermined threshold error value and may be removed if the estimated is less than the predetermined threshold error value.

Figure 13:
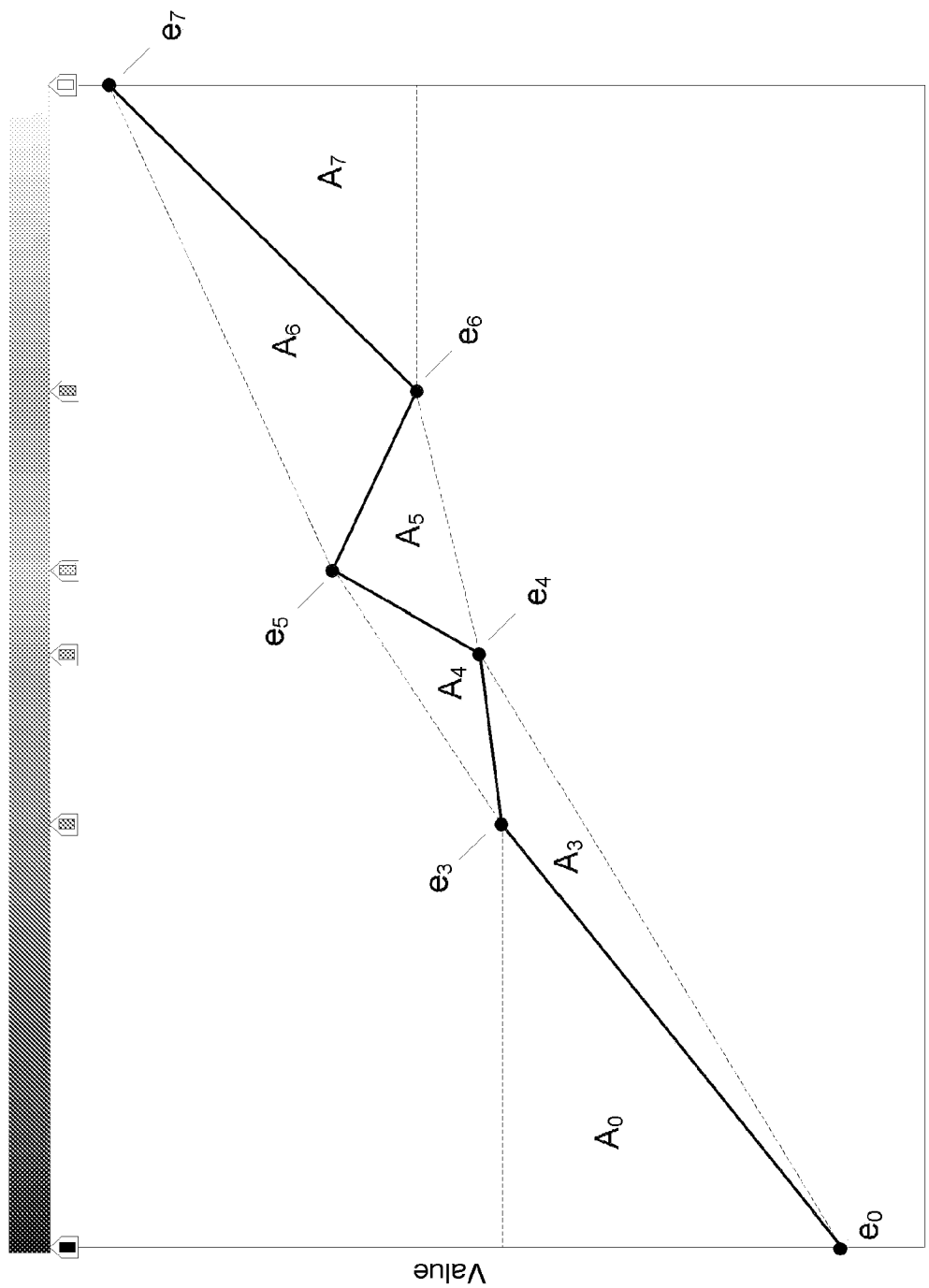
FIG. 13 illustrates an example of an estimated gradient.
Figure 14:
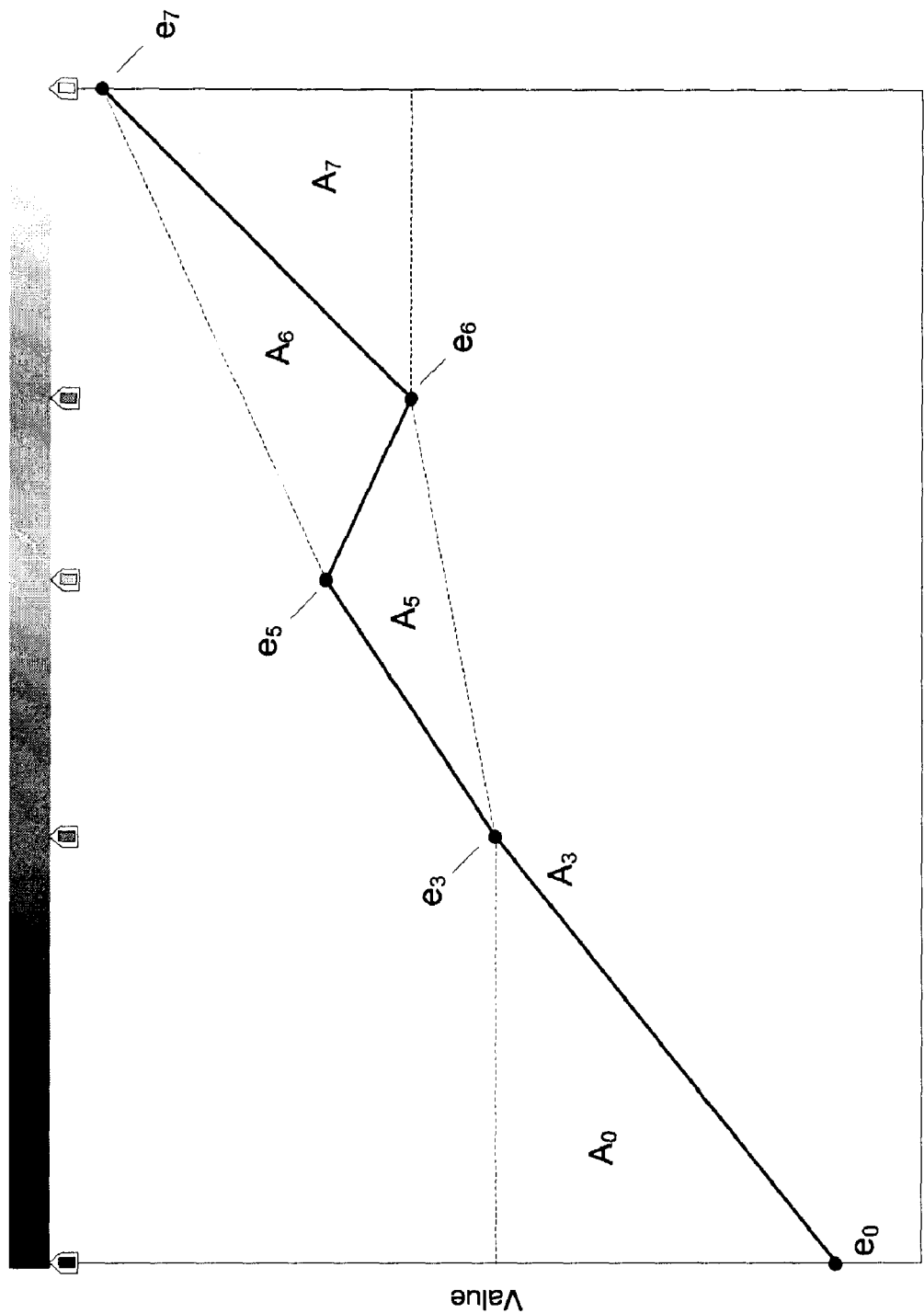
FIG. 14 illustrates another example of an estimated gradient.

FIG. 13 illustrates the graph of FIG. 9 after removal of certain gradient stops. As FIG. 13 shows, gradient stops $e_1$ and $e_2$ have been removed to simplify the gradient. The remaining gradient stops in this example are $e_0$, $e_3$, $e_4$, $e_5$, $e_6$, and $e_7$. Returning to FIG. 8, more than two remaining gradient stops are identified ("Yes" branch of STEP 804). Of the remaining gradient stops, the gradient stop associated with the lowest error of removal is identified (STEP 805) and the error is compared to a predetermined threshold error value as described above. If the error introduced upon removal of the identified gradient stop is less than the threshold error value ("Yes" branch of STEP 806), the identified gradient stop is removed. FIG. 14 illustrates an example in which gradient stop $e_4$ is identified as the gradient stop with the lowest error of removal and the error introduced by removal of gradient stop $e_4$ is less than the predetermined threshold error value. As FIG. 14 illustrates, gradient stop $e_4$ has been removed and adjacent gradient stops have been modified accordingly.

Of the remaining gradient stops (in this example, $e_0$, $e_3$, $e_5$, $e_6$ and $e_7$), the gradient stop associated with the lowest error upon removal is identified. In this example, gradient stop $e_5$ may be identified as the gradient stop associated with the lowest error of the remaining gradient stops. The error associated with removal of gradient stop $e_5$ is compared to the predetermined threshold error value (STEP 806). If the error of removal of the identified gradient stop is greater than the predetermined threshold error value ("No" branch of STEP 806), the remaining gradient stops are retained and a gradient is generated (STEP 808) based on the gradient characteristics from the remaining gradient stops. The gradient may applied to any object or displayed component. For example, the gradient may be applied to a displayed object and output on a display monitor (STEP 809). The gradient may further be stored in memory or output to an output device.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

The invention claimed is:

1. A method of generating a gradient, the method comprising:
    receiving a selection of a portion of an image;
    receiving at least one input comprising an indication of a start point in the image, an indication of an end point in the image, and an indication of a portion of the image between the start point and the end point;
    generating a first plurality of gradient stops corresponding to at least a portion of the selection, wherein the plurality of gradient stops are based on the start point, the end point, and the portion of the image between the start point and the end point; and
    creating a gradient based on the generating.

2. The method of claim 1 wherein the at least one input comprises:
    a first input indicating the start point in the image;
    a second input indicating the end point in the image; and
    a third input indicating a selection of the portion of the image between the start point and the end point in the image.

3. The method of claim 2 wherein each of the first input, the second input, and the third input includes a selection of at least one pixel of the image, and wherein each of the at least one pixel of the first input, the second input, and the third input has a color characteristic and an offset value, the offset value indicating a position of the pixel within the selection.

4. The method of claim 3 wherein the step of generating comprises generating a gradient stop for each of the at least one pixels of the first input, the second input, and the third input, wherein each of the generated gradient stops contain a color characteristic and an offset value of a corresponding pixel.

5. The method of claim 4 wherein the generating step includes generating the first plurality of gradient stops corresponding to a plurality of pixels in the image, the step of creating including:
    removing at least one gradient stop from the first plurality of gradient stops; and
    generating the gradient based on the second plurality of gradient stops.

6. The method of claim 5 wherein removing the at least one gradient stop includes excluding the removed at least one gradient stop from the first plurality of gradient stops to obtain the second plurality of gradient stops.

7. The method of claim 1 wherein the step of generating includes generating the first plurality of gradient stops corresponding to a plurality of pixels in the image, the method further including:
    identifying at least one gradient stop from the first plurality of gradient stops to be removed;
    removing the identified at least one gradient stop based on the identifying.

8. The method of claim 7 wherein identifying the at least one gradient stop to be removed comprises:
    calculating a removal error for each of the gradient stops in the first plurality of gradient stops to obtain a plurality of removal errors associated with the first plurality of gradient stops;
    identifying a lowest removal error in the plurality of removal errors;
    selecting a gradient stop corresponding to the identified lowest removal error.

9. The method of claim 8 wherein the calculated removal error for each of the gradient stops is equal to a corresponding difference between a gradient characteristic in the presence of the gradient stop and the gradient characteristic in the absence of the gradient stop.

10. The method of claim 8 wherein identifying the at least one gradient stop to be removed further comprises comparing the identified lowest removal error of the selected gradient stop to a predetermined threshold error value and the step of removing the identified at least one gradient stop includes removing the selected gradient stop based on the comparing.

11. The method of claim 10 wherein removing the selected gradient stop comprises removing the selected gradient stop if the identified lowest removal error of the selected gradient stop is less than or equal to the predetermined threshold error value, otherwise, retaining the selected gradient stop.

12. The method of claim 11 wherein the step of identifying at least one gradient stop from the first plurality of gradient stops to be removed includes determining that each remaining gradient stop has a corresponding removal error that is greater than the predetermined threshold error value, the step of creating a gradient comprising generating a gradient based on the remaining gradient stops.

13. The method of claim 12 wherein the generated gradient excludes removed gradient stops.

14. A method of generating a gradient, the method comprising:
   receiving a selection of a portion of an image;
   generating a first plurality of gradient stops corresponding to at least a portion of the selection;
   selecting a second plurality of gradient stops from the first plurality of gradient stops; and
   creating a gradient corresponding to the second plurality of gradient stops.

15. The method of claim 14 wherein the generating step further comprises:
   identifying a plurality of pixels in the selection of the image, the pixels having at least one characteristic;
   assigning at least one characteristic to each gradient stop in the first plurality of gradient stops.

16. The method of claim 15 wherein each at least one characteristic includes a color property of the identified pixel.

17. At least one computer-readable medium containing computer-executable code, wherein execution of the computer-executable code performs the following steps:
   displaying an image;
   receiving a selection of at least a portion of the displayed image containing an image pattern, wherein the image pattern includes a color value and a corresponding position of pixels in the selection;
   generating a plurality of gradient stops corresponding to the image pattern of the selected at least a portion of the displayed image, wherein each gradient stop in the generated plurality of gradient stops includes a color value and position corresponding to an associated pixel in the selection; and
   generating a gradient based on at least a portion of the plurality of gradient stops.

18. The computer-readable media of claim 17 wherein generating the plurality of gradient stops comprises:
   determining a removal error value for each gradient stop in the plurality of gradient stops, the removal error value comprising a difference between an image characteristic of the image pattern in the presence of the gradient stop and the image characteristic in the absence of the gradient stop;
   identifying the lowest removal error value of the determined removal error values;
   comparing the identified lowest removal error value with a predetermined threshold error value;
   removing a gradient stop corresponding to the identified lowest removal error value based on the comparing.

19. The computer-readable media of claim 18 wherein generating the gradient includes generating a gradient comprising an image pattern corresponding to at least a portion of the plurality of gradient stops and excluding removed gradient stops.

* * * * *